US008770566B2

(12) United States Patent
Takeda (10) Patent No.: US 8,770,566 B2
(45) Date of Patent: Jul. 8, 2014

(54) REMOVABLY SUPPORTING MECHANISM FOR WORKPIECE HOLDING DEVICE AND WORKPIECE HOLDING DEVICE REPLACEMENT AND SUPPORT APPARATUS

(75) Inventor: Keisuke Takeda, Kanagawa (JP)

(73) Assignee: Aida Engineering, Ltd., Kanagawa (JP)

( * ) Notice: Subject to any disclaimer, the term of this patent is extended or adjusted under 35 U.S.C. 154(b) by 91 days.

(21) Appl. No.: 13/530,760

(22) Filed: Jun. 22, 2012

(65) Prior Publication Data

US 2012/0326373 A1 Dec. 27, 2012

(30) Foreign Application Priority Data

Jun. 22, 2011 (JP) ................................. 2011-138796

(51) Int. Cl.
*B25B 1/22* (2006.01)
*B23Q 3/00* (2006.01)
*A63B 21/06* (2006.01)
*A45D 19/04* (2006.01)
*B23Q 1/26* (2006.01)

(52) U.S. Cl.
USPC ................ 269/74; 269/296; 482/94; 248/127

(58) Field of Classification Search
CPC ............. B23Q 1/28; B23Q 1/525; B25B 1/22
USPC .................. 269/74, 296; 482/94, 99; 248/127
See application file for complete search history.

(56) References Cited

U.S. PATENT DOCUMENTS

| | | | | |
|---|---|---|---|---|
| 4,421,305 A | * | 12/1983 | Kosmowski | 269/287 |
| 4,480,364 A | * | 11/1984 | Kosmowski | 29/56.6 |
| 4,538,786 A | * | 9/1985 | Manning | 248/544 |
| 4,993,686 A | * | 2/1991 | Diaz | 254/133 R |
| 5,098,053 A | * | 3/1992 | Cotterill | 248/281.11 |
| 5,174,693 A | * | 12/1992 | Lee et al. | 408/108 |
| 6,174,010 B1 | * | 1/2001 | Fanger et al. | 294/81.4 |
| 6,321,398 B1 | * | 11/2001 | Wang | 5/81.1 R |

(Continued)

FOREIGN PATENT DOCUMENTS

| | | | |
|---|---|---|---|
| JP | 4-238633 A | 8/1992 |
| JP | 04-238633 A | 8/1992 |
| JP | 05-277593 A | 10/1993 |

OTHER PUBLICATIONS

Japanese Office Action issued in Japanese Patent Application No. JP 2011-138796 dated Oct. 24, 2013.

*Primary Examiner* — Lee D Wilson
*Assistant Examiner* — Alvin Grant
(74) *Attorney, Agent, or Firm* — McDermott Will & Emery LLP (57) ABSTRACT

A removably supporting mechanism is provided for a workpiece holding device that can hold and release a workpiece. The workpiece holding device is removably supported on a crossbar extending substantially orthogonal to a workpiece conveying direction of a press machine. The removably supporting mechanism has a guide pin and a guide pin hole. The guide pin is fittable into and engageable with the guide pin hole. One of the guide pin and the guide pin hole is disposed on the workpiece holding device side, whereas another of the guide pin and the guide pin hole is disposed on the crossbar side. The guide pin and the guide pin hole can perform alignment of the workpiece holding device and the crossbar in a direction substantially orthogonal to an inserting direction of the guide pin.

4 Claims, 4 Drawing Sheets

(56) References Cited

U.S. PATENT DOCUMENTS

| | | | |
|---|---|---|---|
| 6,322,064 B1 * | 11/2001 | Tallving | 269/296 |
| 6,464,182 B1 * | 10/2002 | Snyder | 248/71 |
| 6,874,737 B1 * | 4/2005 | Madelone | 248/127 |
| 6,895,648 B1 * | 5/2005 | Willett | 29/402.08 |
| 6,978,652 B1 * | 12/2005 | Meis | 72/457 |
| 7,171,931 B2 * | 2/2007 | Todo et al. | 123/90.16 |
| 7,549,313 B2 * | 6/2009 | Espinosa | 72/457 |
| 7,604,576 B2 * | 10/2009 | Drechsler | 482/99 |
| 7,878,475 B2 * | 2/2011 | Rogers | 248/352 |
| 8,109,484 B2 * | 2/2012 | Rogers | 248/352 |
| 8,366,091 B2 * | 2/2013 | Harder | 269/315 |
| 8,407,831 B2 * | 4/2013 | White et al. | 5/87.1 |
| 2003/0034207 A1 * | 2/2003 | Palmer et al. | 182/201 |
| 2004/0056172 A1 * | 3/2004 | Sedran | 249/189 |
| 2007/0054785 A1 * | 3/2007 | Drechsler | 482/94 |
| 2007/0161472 A1 * | 7/2007 | Drechsler | 482/100 |
| 2011/0254299 A1 * | 10/2011 | Takeda | 294/81.2 |

* cited by examiner

Fig. 4D

REMOVABLY SUPPORTING MECHANISM FOR WORKPIECE HOLDING DEVICE AND WORKPIECE HOLDING DEVICE REPLACEMENT AND SUPPORT APPARATUS

FIELD OF THE INVENTION

The present invention relates to a removably supporting mechanism for a workpiece holding device of a workpiece conveying apparatus which holds and conveys a workpiece, and to a workpiece holding device replacement and support apparatus suitable for supporting the workpiece holding device including the removably supporting mechanism.

BACKGROUND

Conventionally, a variety of conveying apparatus for conveying a workpiece between press machines or the like have been proposed.

For example, there is a workpiece conveying apparatus including a crossbar unit extending in a direction substantially orthogonal to a workpiece conveying direction. In such an apparatus, for example, as described in Japanese Patent Application Laid-open No. Hei 04-238633 (hereinafter, referred to as Patent Document 1), a crossbar 2 (refer to reference symbol 2 in Patent Document 1) is disposed so as to transversely cross the workpiece conveying direction and is reciprocated in the workpiece conveying direction and the direction opposite to the same. The crossbar 2 has a workpiece gripper attachment 4 (refer to reference symbol 4 in Patent Document 1) mounted thereto, for holding and releasing a workpiece by vacuum adsorption, magnetic adsorption, or the like Note that, a plurality of kinds of such workpiece gripper attachments are prepared in accordance with sizes or shapes of workpieces, and during preparatory work, there is performed an operation of replacing a workpiece gripper attachment with another workpiece gripper attachment to be used in accordance with the workpiece.

Here, there is supposed a case where such replacement operations of workpiece gripper attachments are manually performed during the preparatory work. For example, in the apparatus described in Patent Document 1, two locking mechanisms 20 (refer to reference symbol 20 in Patent Document 1) are provided to a single workpiece gripper attachment 4, and each of these locking mechanisms 20 includes two lock pins 22 (refer to reference symbol 22 in Patent Document 1). Accordingly, when the workpiece gripper attachment 4 is to be mounted to or removed from the crossbar 2, operations of simultaneously removing four lock pins 22 from tapered holes 15 (refer to reference symbol 15 in Patent Document 1) are required, and hence two or more workers may be required to perform the operations.

Therefore, when the replacement operations of workpiece gripper attachments are manually performed in the apparatus described in Patent Document 1, the working efficiency is actually deteriorated.

Note that, when the replacement operations of workpiece gripper attachments are to be automatically performed, the following configuration is required. For example, in the apparatus described in Patent Document 1, as described above, two locking mechanisms 20 are provided to a single workpiece gripper attachment 4, and each of the locking mechanisms 20 includes two lock pins 22. Accordingly, when the workpiece gripper attachment 4 is to be mounted to or removed from the crossbar 2, the operations of simultaneously removing four lock pins 22 from the tapered holes 15 are required.

Therefore, in the apparatus described in Patent Document 1, it is required to provide a plurality of unlocking cylinders 30 (actuators) for removing the lock pins 22 from the tapered holes 15, to a receiving member 26 (refer to reference symbol 26 in Patent Document 1) for supporting a workpiece gripper attachment 4 not to be used. When such a plurality of unlocking cylinders 30 (actuators) are provided, the apparatus configuration may become complicated, the weight and size may become larger, and the cost may increase.

In the apparatus described in Patent Document 1, the workpiece gripper attachment 4 includes a pair of locking mechanisms 20, which each includes two lock pins 22, and hence the weight may increase.

Note that, there is a demand for speeding up the conveying speed of the workpiece, and also speeding up the press working (improvement of productivity). Accordingly, a crossbar having a workpiece gripper attachment mounted thereon is reciprocated between press machines with relatively high speed, and hence the weight of the workpiece gripper attachment is desired to be reduced as much as possible. When the weight of the workpiece gripper attachment increases, speedup of the conveying speed of the workpiece (reciprocating speed of crossbar) causes large vibrations or the like due to its large inertial force. Accordingly, the workpiece conveying speed cannot be actually increased beyond a predetermined level.

SUMMARY OF THE INVENTION

The present invention has been made in view of the above-mentioned circumstances, and it is an object thereof to provide a removably supporting mechanism for a workpiece holding device, which is capable of removably supporting, on a crossbar, a workpiece holding device for holding a workpiece easily and smoothly while realizing a light weight and compact configuration in a simple manner and at low cost, and to provide a workpiece holding device replacement and support apparatus suitable for supporting a workpiece holding device including the above-mentioned removably supporting mechanism.

Moreover, it is an object of the present invention to enable easy replacement of the workpiece holding device with respect to the crossbar or the like by using the above-mentioned removably supporting mechanism for a workpiece holding device and the above-mentioned workpiece holding device replacement and support apparatus so that preparatory work can be performed easily and quickly with high efficiency and accuracy, and thus productivity is improved by shortening the time of preparatory work.

Thus, according to an exemplary embodiment of the present invention, there is provided a removably supporting mechanism for a workpiece holding device for holding and releasing a workpiece, the workpiece holding device being removably supported on a crossbar extending substantially orthogonal to a workpiece conveying direction of a press machine, the removably supporting mechanism including:

one of at least one guide pin and at least one guide pin hole disposed on the workpiece holding device side, the at least one guide pin being fittable into and engageable with the at least one guide pin hole; and another of the at least one guide pin and the at least one guide pin hole disposed on the crossbar side corresponding to the one of the at least one guide pin and the at least one guide pin hole, in which the at least one guide pin is fitted into and engaged with the at least one guide pin hole to perform alignment (or positioning) between the workpiece holding device and the crossbar in a direction substantially orthogonal to an inserting direction of the at least one guide pin, in which the workpiece holding device abuts against the crossbar in the inserting direction of the at least one guide pin to perform alignment between the workpiece holding device and the crossbar in the inserting direction of the at least one guide pin, in which the removably supporting mechanism further includes a latching mechanism for locking the workpiece holding device and the crossbar with each other at an alignment position in the inserting direction of the at least one guide pin through a relative movement between the workpiece holding device and the crossbar when the at least one guide pin is fitted into and engaged with the at least one guide pin hole, and in which the removably supporting mechanism is configured to removably support the workpiece holding device on the crossbar by locking the workpiece holding device with the crossbar at the alignment position in the inserting direction of the at least one guide pin by the latching mechanism when supporting the workpiece holding device on the crossbar, and by releasing a locking between the workpiece holding device and the crossbar by the latching mechanism when enabling the workpiece holding device to be released from the crossbar.

According to the exemplary embodiment of the present invention, the latching mechanism may include an engagement portion which is disposed on one of the workpiece holding device and the crossbar, the engagement portion abutting against another of the workpiece holding device and the crossbar in accordance with an approach between the workpiece holding device and the crossbar through their relative movement so as to be retracted against an elastic biasing force, the engagement portion being moved to an engagement position by the elastic biasing force when the workpiece holding device and the crossbar approach each other up to the alignment position in the inserting direction of the at least one guide pin so that the workpiece holding device and the crossbar are locked with each other.

According to the exemplary embodiment of the present invention, the locking between the workpiece holding device and the crossbar by the latching mechanism may be released by retracing the engagement portion, which locks the workpiece holding device with the crossbar at the alignment position in the inserting direction of the at least one guide pin, from the engagement position against the elastic biasing force.

According to another exemplary embodiment of the present invention, there is provided a workpiece holding device replacement and support apparatus for receiving, from a crossbar, and supporting a workpiece holding device, which is removably supported on the crossbar by the removably supporting mechanism for a workpiece holding device according to the exemplary embodiment of the present invention, the workpiece holding device replacement and support apparatus including:

a groove which receives a part of the workpiece holding device; and an engagement pin which is elastically biased toward the part of the workpiece holding device and protrudes from an inside of the groove, in which the workpiece holding device replacement and support apparatus is configured to support the workpiece holding device and bring the crossbar into a state movable to a different position in the following manners:

the groove receives the part of the workpiece holding device, which is conveyed in a state of being supported on the crossbar, and the engagement pin holds the workpiece holding device at a predetermined position in the groove; and the engagement portion of the latching mechanism is retracted from the engagement position against the elastic biasing force by causing a releasing pin to act on the engagement portion in association with a receiving motion into the groove so that the locking between the workpiece holding device and the crossbar by the latching mechanism is released so as to release the workpiece holding device from the crossbar.

In the workpiece holding device replacement and support apparatus according to the another exemplary embodiment of the present invention, when the crossbar approaches the workpiece holding device replacement and support apparatus for receiving the workpiece holding device supported by the workpiece holding device replacement and support apparatus, under a state in which the workpiece holding device and the crossbar are aligned with each other by the at least one guide pin and the at least one guide pin hole in accordance with an approaching motion of the crossbar, the crossbar may support the workpiece holding device by locking the crossbar and the workpiece holding device with each other by the engagement portion of the latching mechanism, and when the crossbar supporting the workpiece holding device moves to the different position, in accordance with its movement, the engagement pin may be retracted against the elastic biasing force so as to release a holding of the workpiece holding device in the groove.

According to the present invention, it is possible to provide the removably supporting mechanism for a workpiece holding device, which is capable of removably supporting, on a crossbar or the like, a workpiece holding device for holding a workpiece easily and smoothly while realizing a light weight and compact configuration in a simple manner and at low cost, and to provide the workpiece holding device replacement and support apparatus suitable for supporting a workpiece holding device including the above-mentioned removably supporting mechanism.

Moreover, according to the present invention, it is possible to perform easy replacement of the workpiece holding device with respect to the crossbar or the like by using the removably supporting mechanism for a workpiece holding device and the workpiece holding device replacement and support apparatus according to the present invention so that preparatory work can be performed easily and quickly with high efficiency and accuracy, and thus productivity is improved by shortening the time of preparatory work.

DETAILED DESCRIPTION

With reference to the attached drawings, there is described hereinafter an embodiment illustrating an example of a removably supporting mechanism for a workpiece holding device which is used in a workpiece conveying apparatus for a pressing machine (press machine) according to the present invention. Note that, the present invention is not limited to the embodiment described hereinafter.

The workpiece conveying apparatus for a pressing machine according to this embodiment is used for conveying a workpiece W between press machines, for example.

Note that, as such a workpiece conveying apparatus, for example, there is an arm-type workpiece conveying apparatus for conveying a workpiece by swinging an arm disposed on a post or the like which is installed between the press machines, or a feed bar-type workpiece conveying apparatus for conveying a workpiece by horizontally moving a feed bar supported on a rail and the like which is mounted between the press machines. The present invention can be applied to any type of the workpiece conveying apparatus.

Here, as an example, a case where an arm-type workpiece conveying apparatus is adopted is described.

Figure 1:
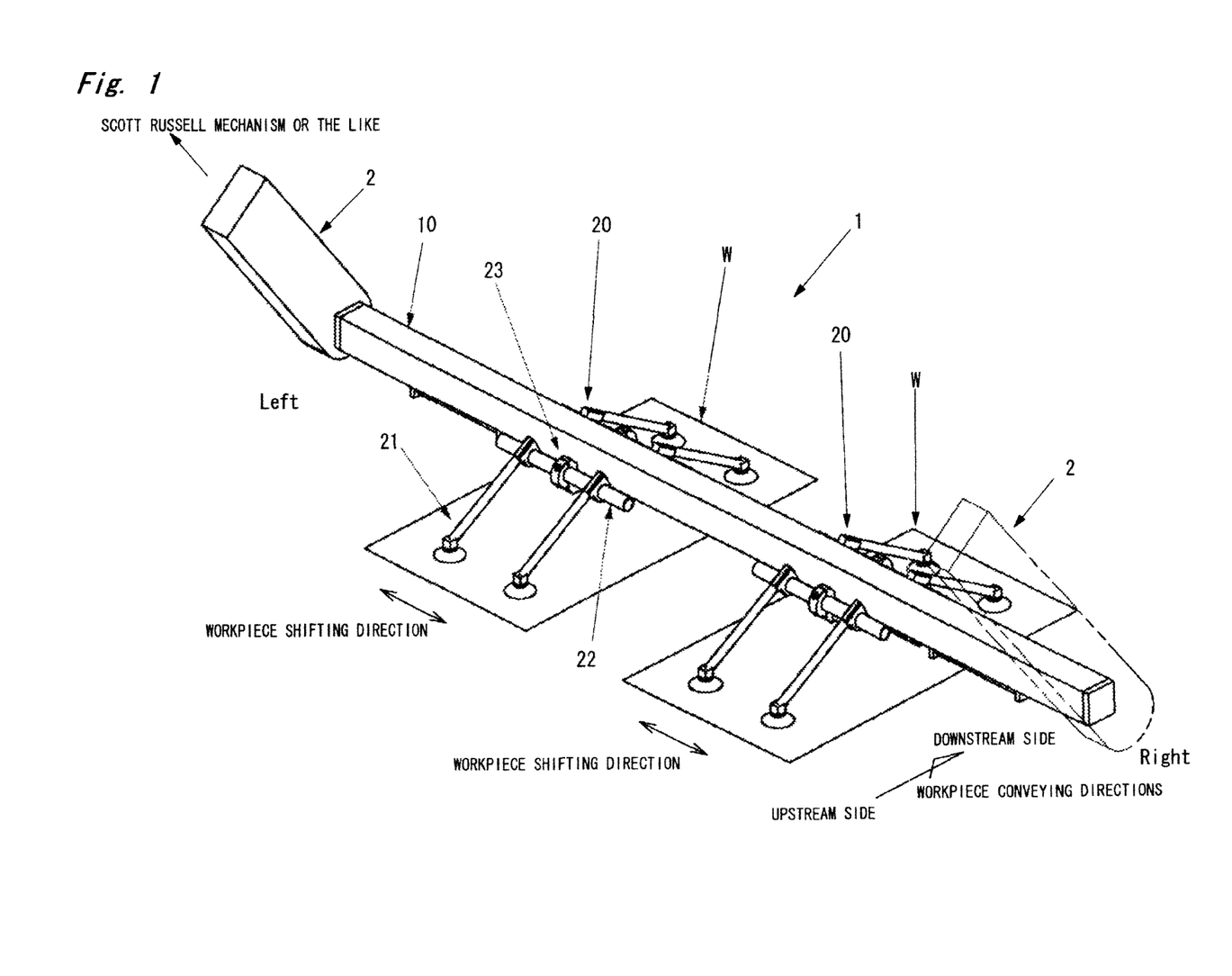
FIG. 1 is a perspective view schematically illustrating an entire configuration of a workpiece conveying apparatus for a press machine according to an embodiment of the present invention.

As illustrated in FIG. 1, a workpiece conveying apparatus 1 for a pressing machine according to this embodiment holds the workpiece W by vacuum absorption or the like using a workpiece holding device 20 which is removably supported on a crossbar 10. Then, while keeping the holding state, the workpiece conveying apparatus 1 swings swingable arms 2 which are connected on their proximal sides to a Scott Russell mechanism and the like of a driving apparatus for conveying a workpiece (now shown), and thus the crossbar 10 connected to the distal ends of the swingable arms 2 is substantially horizontally moved to a conveying direction downstream side so that the workpiece holding device 20 and thus the workpiece W are conveyed to the conveying direction downstream side.

Then, in this manner, when the workpiece W is conveyed to a predetermined position on the conveying direction downstream side by swinging the swingable arm 2, the vacuum adsorption or the like by the workpiece holding device 20 is released so as to release the workpiece W.

After that, for holding a next workpiece W, the driving apparatus for conveying a workpiece swings the swingable arms 2 in the opposite direction (conveying direction upstream side) so that the crossbar 10 connected to the distal ends of the swingable arms 2 are substantially horizontally moved to the conveying direction upstream side. Accordingly, the workpiece holding device 20 is returned to the original position (position where the holding of the next workpiece W is started).

Note that, as illustrated in FIG. 1, when two workpieces W are simultaneously conveyed, there may be adopted a configuration including a lateral movement mechanism (workpiece shifting mechanism) which can move the workpiece holding device 20 in the longitudinal direction of the crossbar 10 (workpiece shifting direction) during the conveyance so that the position of the workpiece W in the longitudinal direction of the crossbar 10 (workpiece conveying direction lateral position) can be adjusted to a mold position of a press machine for the next step.

By the way, FIG. 1 illustrates an example in which the two workpieces W are simultaneously conveyed by each of two workpiece holding devices 20 holding a single workpiece W. However, the present invention is not limited to this case, and can be applied to a case where a single workpiece W is held by two workpiece holding devices 20.

Here, when the workpiece W to be formed by a press machine is changed, the shape and size of the workpiece W are accordingly changed so that the workpiece holding device 20 may need to be replaced with another workpiece holding device 20 suitable for the shape and size of the workpiece W.

With respect to such a case, in this embodiment, a workpiece holding device replacement and support truck 90 is disposed outside the press machine (not shown), thereby enabling the workpiece holding device 20, which is to be mounted to the crossbar 10, to be automatically replaced.

Figure 2:
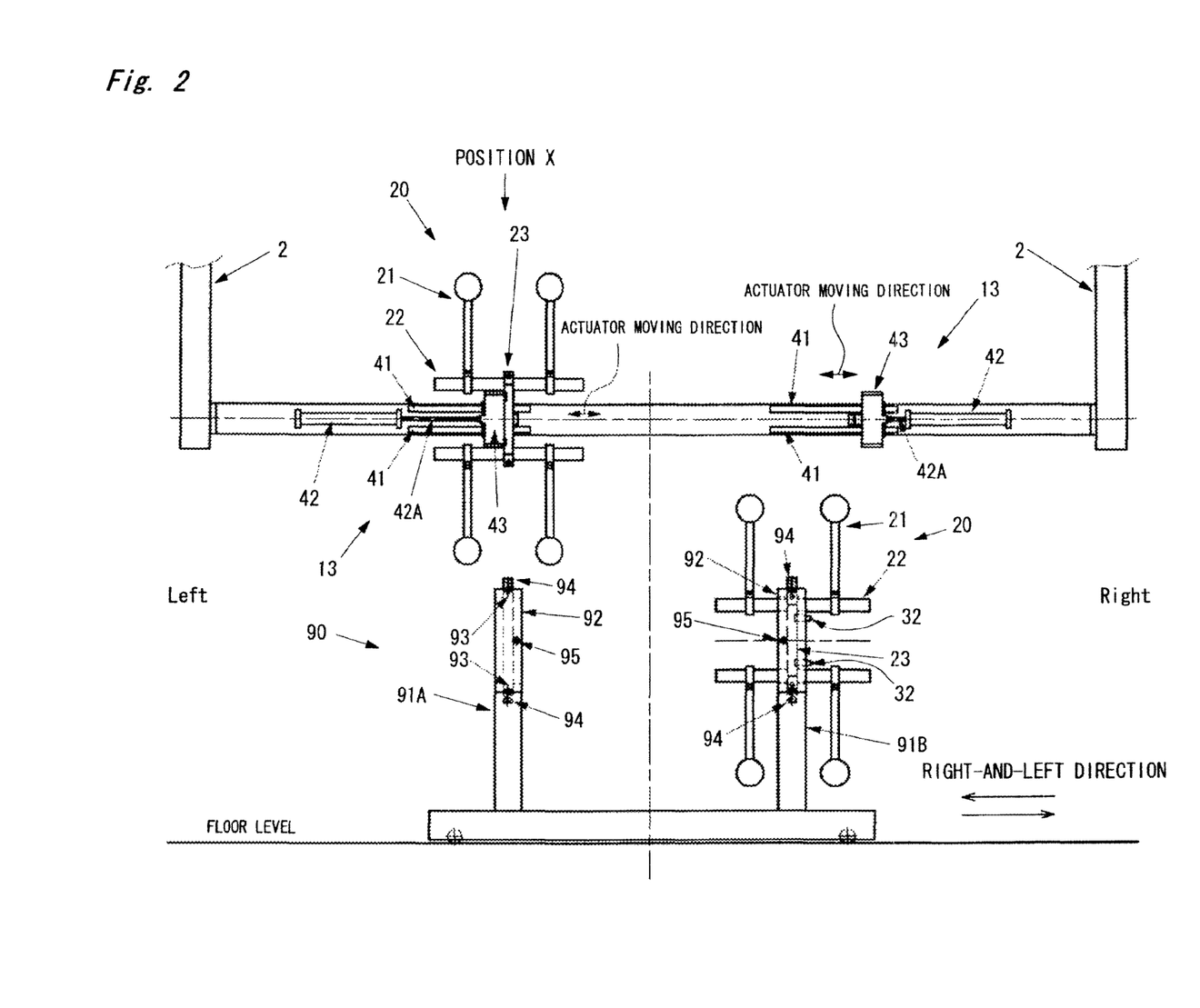
FIG. 2 is a view illustrating a crossbar and a workpiece holding device forming the workpiece conveying apparatus for a press machine according to the above-mentioned embodiment, and a workpiece holding device replacement and support stand provided on a workpiece holding device replacement and support truck, viewed from an upstream side (or downstream side) in a workpiece conveying direction.

For example, a plurality of workpiece holding device replacement and support trucks 90 are prepared, and are normally retracted to positions where there is no interference with movable portions, such as the crossbar 10, on a right side of FIG. 2 (or left side or lower side thereof). However, during preparatory work, when the workpiece holding device 20 to be mounted to the crossbar 10 is automatically replaced, the replacing work is performed as described below.

Note that, in FIG. 2, attachment holders (or mounting holders) 43 of the crossbar 10 are brought to front positions, but during the conveyance of the workpiece, as illustrated in FIG. 1, the attachment holders 43 of the crossbar 10 are set to positions where the attachment holders 43 face downward. That is, the crossbar 10 can be rotatable about its longitudinal axis.

FIG. 2 illustrates an example of the workpiece holding device replacement and support truck 90 under a state in which, for example, a workpiece holding device replacement and support stand 91A on the left side holds no workpiece holding device 20, and a workpiece holding device replacement and support stand 91B on the right side holds the workpiece holding device 20 suitable for the workpiece W to be formed next.

The workpiece holding device replacement and support truck 90 under such a state moves along the right-and-left direction of the press machine so that the workpiece holding device replacement and support stand 91A on the left side of FIG. 2 is positioned in the vicinity of the attachment holder 43 on the left side of the crossbar 10 (in the vicinity of position X), thereby receiving the workpiece holding device 20, which has been used so far and is to be replaced, from the attachment holder 43 in the vicinity of the position X of the crossbar 10.

Next, the workpiece holding device replacement and support truck 90 moves so that the workpiece holding device replacement and support stand 91B on the right side of FIG. 2 is positioned in the vicinity of the attachment holder 43 on the left side of the crossbar 10 (in the vicinity of the position X). Then, the workpiece holding device 20 to be used next which is supported by the workpiece holding device replacement and support stand 91B on the right side is transferred to the attachment holder 43 in the vicinity of the position X of the crossbar 10, and the workpiece holding device replacement and support truck 90 is returned to the original retracted position.

The transfer of the workpiece holding device 20 described above is performed with respect to each of the attachment holders 43 of the crossbar 10 so that automatic replacement of the workpiece holding device 20 is completed.

Note that, in this embodiment, an example is described in which the two workpiece holding device replacement and support stands 91A, 91B are disposed upright on a single workpiece holding device replacement and support truck 90, the present invention is not limited to this case. Specifically, a single workpiece holding device replacement and support stand may be disposed on each of the workpiece holding device replacement and support trucks so that the workpiece holding devices 20 are transferred to the crossbar 10 by independently moving each of the workpiece holding device replacement and support trucks.

Figure 3:
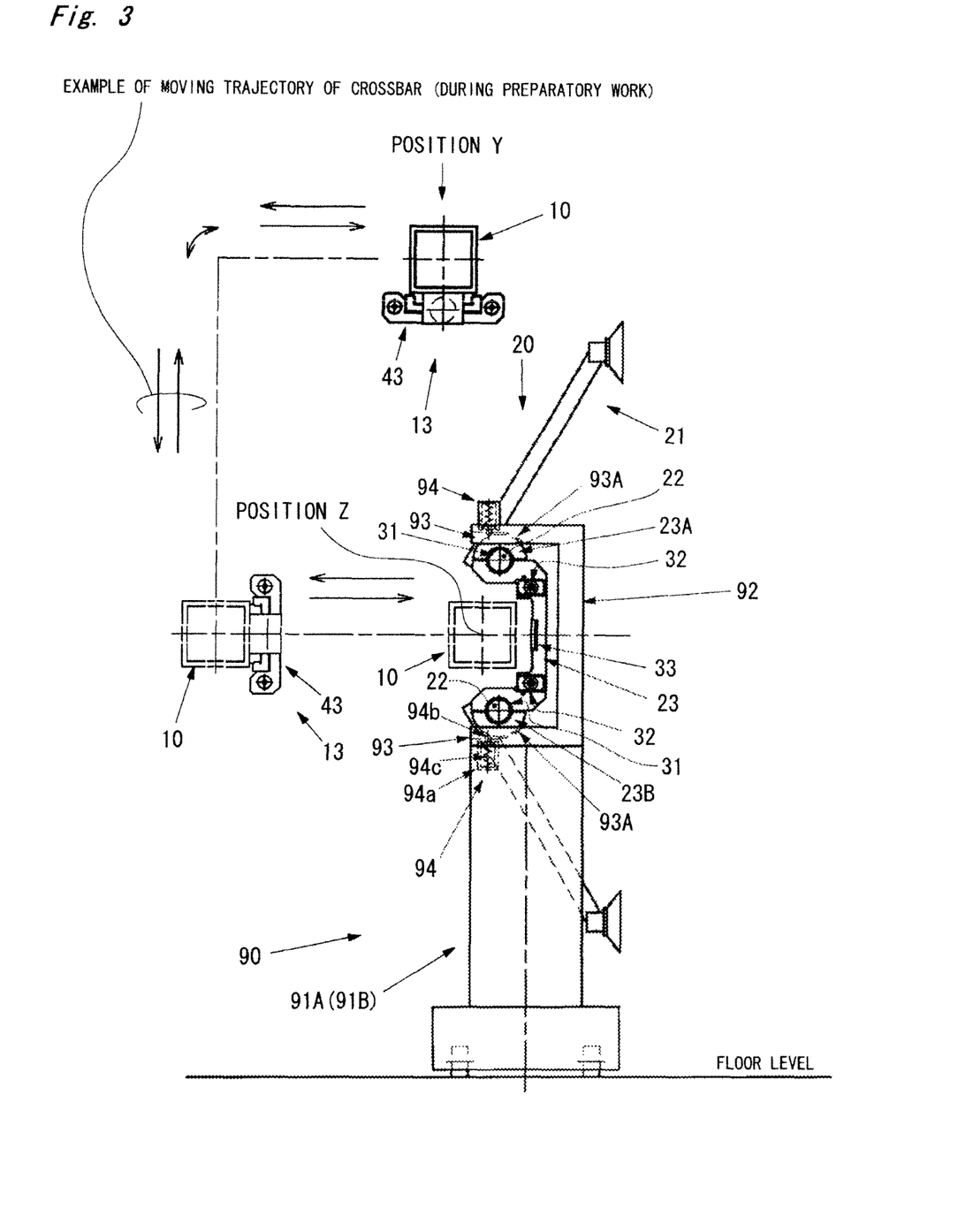
FIG. 3 is a side view illustrating the crossbar, the workpiece holding device, and the workpiece holding device replacement and support stand provided on the workpiece holding device replacement and support truck of FIG. 2, viewed from a left side of FIG. 2.

The workpiece holding device replacement and support stand 91A (91B) mounted to the workpiece holding device replacement and support truck 90 is, as illustrated in FIGS. 2 and 3, includes a receiving member 92 having a substantially U-shaped cross section for receiving inside and supporting an attachment (or a holder) 23 of the workpiece holding device 20. Grooves 93, where both side portions 23A, 23B of the attachment 23 of the workpiece holding device 20 can be fitted into and removed from, are formed on the side portions of the receiving member 92 extending on both sides of the substantially U-shaped cross section.

Note that, the terminal ends of the grooves 93 on the downstream side in an inserting direction are arc-shaped so as to correspond to the shapes of the both side portions 23A, 23B of the attachment 23. When the both side portions 23A, 23B of the attachment 23 abut against arc-shaped portions 93A described above, the attachment 23 is aligned in the inserting direction of the attachment 23 with respect to the receiving member 92.

In the bottom portion of the groove 93, there is disposed a plunger 94 for holding the attachment 23 inserted into the groove 93 at an alignment position.

Moreover, in the receiving member 92, there is disposed a releasing pin 95 for releasing a latch 54 described later which is used for locking the workpiece holding device 20.

Figure 4A:
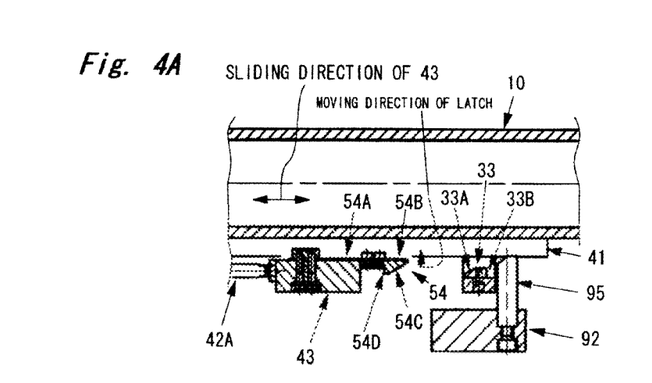
FIG. 4A is a top view (A-A cross-sectional view of FIG. 4B) illustrating a motion of the crossbar according to this embodiment when moving for receiving the workpiece holding device which is supported on the workpiece holding device replacement and support stand.
Figure 4B:
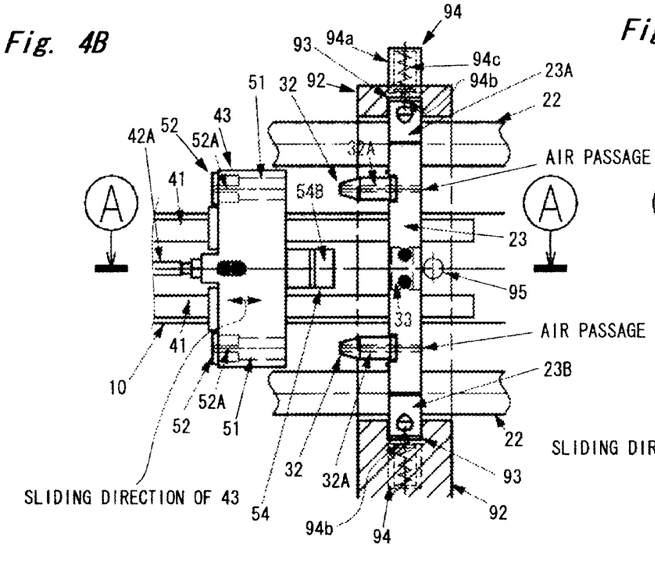
FIG. 4B is a view illustrating the motion of FIG. 4A, viewed from a left direction of FIG. 3 (workpiece conveying direction)

The above-mentioned plunger 94, as illustrated in detail in FIGS. 3 and 4B, includes a cylindrical bottomed main body 94a which has a thread groove formed on its outer circumference and is opened on one side thereof so as to have a space inside, an engagement pin 94b movably inserted into the inside space of the main body 94a, and a spring 94c for biasing the engagement pin 94b toward the opening direction.

The distal end of the engagement pin 94b faces the bottom portion of the groove 93 and protrudes from the bottom portion. Note that, the protruding position of the distal end of the engagement pin 94b is set at a position, as illustrated in FIG. 3, which is opposite to the arc-shaped portion 93A across each of the both side portions 23A, 23B of the attachment 23 and where the distal end of the engagement pin 94b abuts against each of the both side portions 23A, 23B of the attachment 23. With this, when the both side portions 23A, 23B of the attachment 23 abut against the arc-shaped portions 93A of the grooves 93, the attachment 23 is held at its alignment position.

With this configuration, when the attachment 23 of the workpiece holding device 20 is pushed toward the right side of FIG. 3 by a given force, the above-mentioned engagement pin 94b is applied with a force in a direction of pushing-in the protrusion of the distal end of the engagement pin 94b. When this force exceeds the elastic force of the spring 94c, the distal end of the engagement pin 94b is pushed-in so that the both side portions 23A, 23B of the attachment 23 are accommodated in the grooves 93 of the receiving member 92.

Moreover, when the both side portions 23A, 23B of the attachment 23 are pushed to the extent that the both side portions 23A, 23B abut against the arc-shaped portions 93A of the grooves 93, the distal ends of the above-mentioned engagement pins 94b protrude from the bottom portions so as to engage with the both side portions 23A, 23B of the attachment 23. Accordingly, the receiving member 92 of the workpiece holding device replacement and support stand 91A (91B) grips each of the both side portions 23A, 23B of the attachment 23 between the distal end of the engagement pin 94b and the arc-shaped portion 93A. In this manner, the attachment 23, and thus the workpiece holding device 20, can be held at a predetermined position.

On the other hand, when the attachment 23 of the workpiece holding device 20 is pulled toward the left side of FIG. 3 by a given force, the both side portions 23A, 23B of the attachment 23 are caused to move toward the left side of FIG. 3, and thus, the above-mentioned engagement pin 94b is applied with a force in a direction of pushing-in the protrusion of the distal end of the engagement pin 94b. When this force exceeds the elastic force of the spring 94c, the distal end of the engagement pin 94b is pushed-in so that the engagement between the distal ends of the above-mentioned engagement pins 94b and the both side portions 23A, 23B of the attachment 23 is released. In this manner, the attachment 23, and thus the workpiece holding device 20, can be removed from the receiving member 92 of the workpiece holding device replacement and support stand 91A (91B).

Note that, the workpiece holding device 20 includes, as illustrated in FIGS. 2 and 3 and the like, vacuum cups 21 for holding and releasing the workpiece W, pipe-shaped elements 22 supported by the attachment 23, for supporting the vacuum cups 21, and the attachment 23 which supports the pipes 22 and is mountable to and removable from (fittable into and removable from) a holder 13 of the crossbar 10.

The attachment 23 is formed, as illustrated in FIG. 3, into a substantially U-shaped cross section. The outer circumferential sides of the both side portions 23A, 23B of the attachment 23 are formed to be substantially arc-shaped, and in the vicinity of the centers of the both side portions 23A, 23B, there are respectively provided supporting holes 31 through which the pipe-shaped elements 22 are fitted to be supported.

Figure 4C:
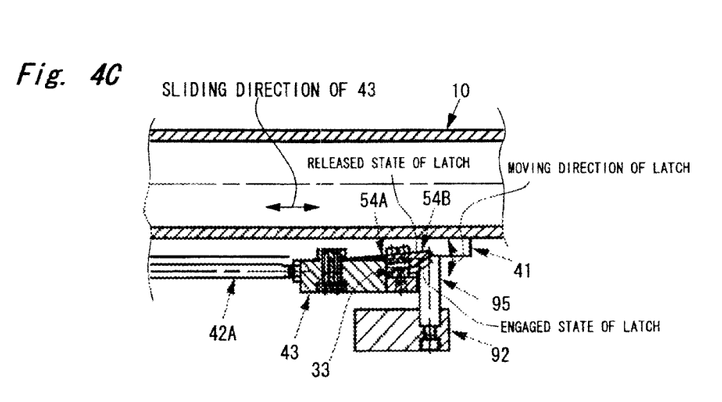
FIG. 4C is a top view (B-B cross-sectional view of FIG. 4D) illustrating a locking (lock) motion between the crossbar and the workpiece holding device by a latching mechanism.
Figure 4D:
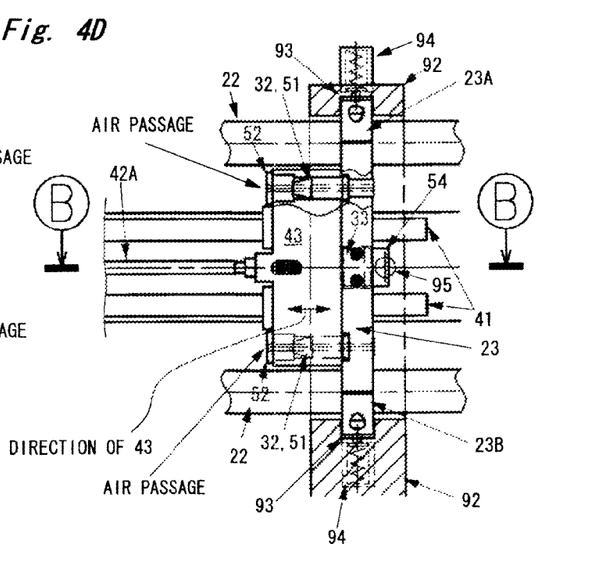
FIG. 4D is a view illustrating the motion of FIG. 4C, viewed from a left direction of FIG. 3 (workpiece conveying direction).

Moreover, at the bottom portions of the substantially U-shaped cross sections of the attachment 23 on the inner side of the supporting holes 31 (both side portions 23A, 23B), as illustrated in FIGS. 2, 4B, and 4D, there are provided two guide pins 32 which protrude laterally (to the side connected to the holder 13 which is mounted on the crossbar 10 side).

Each of the distal ends of these guide pins 32 is formed, as illustrated in FIGS. 4B and 4D and the like, into a tapered shape so that engagement with a guide pin hole 51 opened in the holder 13 of the crossbar 10 becomes smooth.

Note that, an air passage 32A is formed in the vicinity of substantially the center of each of the two guide pins 32.

As illustrated in FIGS. 3 and 4A to 4D, the attachment 23 is provided with, at the bottom portion of the substantially U-shaped cross section thereof, a stopper block portion 33 for engaging with the latch 54 which is mounted to the attachment holder 43 of the crossbar 10.

As illustrated in FIGS. 4A and 4C, the latch 54 is disposed so as to protrude from the attachment holder 43 toward the attachment 23 side. The latch 54 has a tapered shape (tapered surface 54C) on the front surface on the stopper block portion 33 side and a planar shape on the rear surface. The tapered surface 54C on the front surface side extends from the distal end side and ends on the proximal end side over a predetermined length. The latch 54 includes behind the tapered surface 54C an engagement surface 54D which advances toward the rear surface side.

The latch 54 is elastically deformable in the directions illustrated in FIGS. 4A and 4C. For example, the latch 54 can be configured by mounting a wedge portion 54B to a plate-shaped spring element (plate spring) 54A which is fixed at its one end to the attachment holder 43.

As illustrated in FIGS. 4A and 4C, the stopper block portion 33 for engaging with such a latch 54 protrudes toward the opening side of the bottom portion of the substantially U-shaped cross section of the attachment 23 so as to correspond to the tapered shape of the latch 54, and includes a tapered surface 33A which is tapered toward the latch 54 side. The tapered surface 33A extends from its distal end and ends at a predetermined length. The stopper block portion 33 includes behind the tapered surface 33A an engagement surface 33B which advances toward the bottom portion side of the substantially U-shaped cross section of the attachment 23.

Note that, the holder 13 is disposed on the crossbar 10 as illustrated in FIG. 3, and includes the following as illustrated in FIGS. 4A to 4D: a guide rail 41 disposed on the crossbar 10 for guiding the movement of the attachment holder 43 along the longitudinal direction of the crossbar 10; an actuator 42 disposed on the crossbar 10 and provided with an output portion 42A connected to the attachment holder 43, for driving and moving the attachment holder 43 along the longitudinal direction of the crossbar 10 (for example, a fluid pressure-type actuator, such as an air cylinder, and a hydraulic cylinder, or an actuator which can be driven to linearly reciprocate, using a ball screw, or a rack and a pinion, and the like); and the attachment holder 43 which is engaged with the guide rail 41 and linearly moved by the actuator 42 in the longitudinal direction of the crossbar 10 so as to mount and remove (connect and release) the workpiece holding device 20.

The attachment holder 43 is provided with the two guide pin holes 51 into which the two guide pins 32 disposed on the attachment 23 of the workpiece holding device 20 are removably fitted, respectively.

At the bottom portion of the guide pin hole 51, there is disposed a cushion 52 made of, for example, an elastic element of a resin, such as rubber and silicon.

The cushion 52 is provided with an air passage 52A which communicates to the air passage 32A opened substantially in the center of the guide pin 32 when the guide pin 32 is fitted into the guide pin hole 51.

This cushion 52 allows the air passage 32A to communicate to the air passage 52A while ensuring an air tightness against the surroundings.

The air tightness against the surroundings enables the air passage 32A and the air passage 52A communicating to each other to function as an air pressure supply passage to, for example, an air pressure utilizing device (such as the vacuum cup 21 and the moving mechanism) of the attachment 23, and thus the workpiece holding device 20. Accordingly, there is no need for separately disposing an air supply tube or the like, which therefore contributes to simplification of configuration, lowering of cost, weight reduction, and downsizing.

Moreover, the opening of the air passage 32A can contribute to, for example, weight reduction of the guide pin 32.

The attachment holder 43 is provided with the plate spring 54A which is disposed so as to protrude toward the attachment 23 side and in which one end thereof opposite to the attachment 23 side is fixed and the other end thereof is provided with the wedge portion 54B. The latch 54 is formed by the plate spring 54A and the wedge portion 54B.

By the way, the guide rail 41 and the actuator 42 can be omitted, and the attachment holder 43 can be directly mounted to the crossbar 10.

Note that, the holder 13 holds the workpiece holding device 20 on the crossbar 10, and the workpiece holding device 20 holds (or releases) the workpiece W. Accordingly, not only during preparatory work, but also, for example, during conveyance of the workpiece W, the workpiece holding device 20 can be driven to be moved by the actuator 42 of the holder 13 in the longitudinal direction of the crossbar 10 (the workpiece shifting direction in FIG. 1), thereby suitably changing the position of the workpiece holding device 20, and thus the workpiece W in the longitudinal direction of the crossbar 10.

The removably supporting mechanism for a workpiece holding device in the workpiece conveying apparatus according to this embodiment having the above-mentioned configuration performs mounting/removal (replacement) of the workpiece holding device 20 with respect to the crossbar 10 as follows.

(Automatic Replacement)

Here, there is described a case in which the workpiece holding device 20 is automatically mounted to or removed from the crossbar 10.

First, there is described a case in which the workpiece holding device 20 is automatically mounted to the crossbar 10. In such a case, as illustrated in FIG. 3, under a state in which the workpiece holding device 20 is held on the workpiece holding device replacement and support stand 91A (91B), the crossbar 10 holding no workpiece holding device 20 is moved from an original position Y to a workpiece holding device mounting/removal position Z.

Next, the actuator 42 is driven to move the output portion 42A under the state illustrated in FIGS. 4A and 4B in the right direction of FIGS. 4A to 4D (attachment 23 side) so that the attachment holder 43 approaches the attachment 23.

With this, as illustrated in FIGS. 4C and 4D, the guide pin 32 of the attachment 23 is fitted into the guide pin hole 51 of the attachment holder 43 to achieve relative alignment, and in this state, the guide pin 32 pushes the cushion 52 so that the air passage 32A of the guide pin 32 and the air passage 52A of the cushion 52 are connected to each other with air tightness.

Along with the approach between the attachment holder 43 and the attachment 23, the wedge portion 54B of the latch 54 of the attachment holder 43 abuts against the stopper block portion 33 of the attachment 23.

Moreover, when the attachment holder 43 approaches the attachment 23, the tapered surface 54C of the wedge portion 54B is pushed by the tapered surface 33A of the stopper block portion 33 so that the plate spring 54A is elastically deformed upward in FIG. 4A. Then, while the tapered surface 54C of the wedge portion 54B moves in a direction away from the tapered surface 33A of the stopper block portion 33, the attachment holder 43 and the attachment 23 approach each other.

As described above, while the tapered surface 54C of the wedge portion 54B moves along the surface of the stopper block portion 33 (the tapered surface 33A and the like), the attachment holder 43 and the attachment 23 approach each other. When the engagement surface 54D of the wedge portion 54B reaches the engagement surface 33B of the stopper block portion 33 due to this approach, the wedge portion 54B is dropped toward the stopper block portion 33 side so that the engagement surface 54D and the engagement surface 33B are brought into surface contact with each other. With this, the latch 54 and the stopper block portion 33 are engaged with each other so as to be brought into a state in which the latch 54 and the stopper block portion 33 cannot move relative to each other in the right-and-left direction of FIGS. 4C and 4D.

Note that, FIGS. 4C and 4D illustrate a state in which the latch 54 and the stopper block portion 33 are disengaged from each other. In this state, in order that the wedge portion 54B is not dropped toward the stopper block portion 33 side to be engaged with each other, the wedge portion 54B of the latch 54 is pushed upward by the releasing pin 95 so as not to move toward the stopper block portion 33 side.

Here, under the state in which the releasing pin 95 pushes upward the wedge portion 54B of the latch 54 as illustrated in FIGS. 4C and 4D, the pushing-up by the releasing pin 95 is released so that the wedge portion 54B drops toward the stopper block portion 33 side, and the latch 54 and the stopper block portion 33 are engaged with each other, to thereby achieve a locked state in which the latch 54 and the stopper block portion 33 cannot move relative to each other in the right-and-left direction of FIGS. 4C and 4D. After that, when the crossbar 10 is moved from the workpiece holding device mounting/removal position Z in the left direction of FIGS. 4A to 4D, in accordance with this, the engagement by the engagement pin 94b of the plunger 94 is released so that the attachment 23 engaged with the attachment holder 43 is pulled out from the grooves 93 of the receiving member 92 of the workpiece holding device replacement and support stand 91A (91B). With this, the workpiece holding device 20 is moved integrally with the crossbar 10 to the original position (for example, the press work starting position).

Note that, when the workpiece holding device 20 is automatically removed from the crossbar 10 and placed in the receiving member 92 of the workpiece holding device replacement and support stand 91A (91B), an operating procedure reverse to the above-mentioned operating procedure can be applied.

Specifically, first, the crossbar 10 holding the workpiece holding device 20 is moved to the workpiece holding device mounting/removal position Z. At this time, the receiving member 92 of the workpiece holding device replacement and support stand 91A (91B) holds no workpiece holding device 20.

In accordance with this movement, each of the both side portions 23A, 23B of the attachment 23 engaged with the attachment holder 43 pushes down the engagement pin 94b of the plunger 94, and in this state, is accommodated in the groove 93 of the receiving member 92 of the workpiece holding device replacement and support stand 91A (91B).

Then, after each of the both side portions 23A, 23B of the attachment 23 passes over the engagement pin 94b, the engagement pin 94b of the plunger 94 protrudes again so as to prevent the attachment 23 from reversely moving toward the left side of FIG. 3, and the releasing pin 95 pushes upward the wedge portion 54B of the latch 54, thereby releasing the engagement between the attachment holder 43 and the attachment 23.

Corresponding to this, when the actuator 42 is driven to move the output portion 42A under the state illustrated in FIGS. 4C and 4D in the left direction of FIGS. 4A to 4D, the attachment 23 is held in the grooves 93 by the engagement pins 94b of the plunger 94. Accordingly, the attachment 23 is left in the workpiece holding device replacement and support stand 91A (91B), and only the attachment holder 43 is moved in the left direction of FIG. 4A to 4D, resulting in the state illustrated in FIGS. 4A and 4B.

After that, the crossbar 10, which has released the workpiece holding device 20, is returned from the workpiece holding device mounting/removal position Z to, for example, the original position Y of FIG. 3, or is moved for receiving another workpiece holding device 20 supported on another workpiece holding device replacement and support stand 91A (91B).

In this manner, according to the removably supporting mechanism for a workpiece holding device of this embodiment, while a compact and lightweight configuration is realized in a simple manner and at low cost, the workpiece holding device 20 can be automatically mounted to or removed from the crossbar 10, the workpiece holding device replacement and support stand, and the like, and hence, the workpiece holding device 20 can be quickly and smoothly mounted or removed to be replaced.

(Manual Replacement)

Next, there is described a case in which the workpiece holding device 20 is mounted to or removed from the crossbar 10 through hand-powered (manual) work by an operator to be replaced.

First, there is described a case in which the workpiece holding device 20 is mounted to the crossbar 10. In this case, the operator holds the workpiece holding device 20 and inserts the guide pins 32 of the attachment 23 into the guide pin holes 51 of the attachment holder 43. With this, the alignment between the attachment holder 43 and the attachment 23 is performed, and further, the guide pin 32 pushes the cushion 52 so that the air passage 32A of the guide pin 32 and the air passage 52A of the cushion 52 are connected to each other while ensuring air tightness against the surroundings.

Moreover, along with the approach between the attachment holder 43 and the attachment 23, the latch 54 of the attachment holder 43 automatically engages the stopper block portion 33 of the attachment 23 to be locked. Accordingly, the workpiece holding device 20 is mounted to the crossbar 10 to be integrated with each other.

When removing the workpiece holding device 20 from the crossbar 10, the operator manually pushes down the wedge portion 54B of the latch 54 of the attachment holder 43 so as to release the engagement (locking) with the stopper block portion 33, and also separates the attachment holder 43 and the attachment 23 from each other. With this, the workpiece holding device 20 can be removed from the crossbar 10.

As described above, through such simple operations, the workpiece holding device 20 can be mounted to or removed from the crossbar 10 so that the mounting and removal (replacement) operation of the workpiece holding device 20 with respect to the crossbar 10 can be performed by a single operator (alone).

As described above, according to the removably supporting mechanism for a workpiece holding device of this embodiment, the at least one guide pin (alignment pin) 32, which is disposed on the workpiece holding device 20 (attachment 23) side, engages with the at least one guide pin hole 51, which is disposed on the crossbar 10 (attachment holder 43) side corresponding to the at least one guide pin 32, to perform the alignment between the workpiece holding device 20 and the crossbar 10 in the direction substantially orthogonal to the inserting direction of the at least one guide pin 32. In addition, the workpiece holding device 20 (attachment 23) abuts against the crossbar 10 (attachment holder 43) in the inserting direction of the at least one guide pin 32 to perform the alignment of the at least one guide pin 32 in the inserting direction thereof.

Moreover, the removably supporting mechanism includes the latching mechanism for locking the workpiece holding device 20 (attachment 23) and the crossbar 10 (attachment holder 43) with each other at the alignment position in the inserting direction of the at least one guide pin 32 through the relative movement between the workpiece holding device 20 and the crossbar 10. Accordingly, while a light weight and compact configuration is realized in a simple manner and at low cost, the workpiece holding device 20 can be removably supported on the crossbar 10 easily and smoothly. Therefore, through any of the automatic operation and the manual operation by an operator, the preparatory work including a replacement operation of the workpiece holding device 20 can be easily and quickly performed with high efficiency and accuracy, and thus productivity is improved by shortening the preparatory work time.

Note that, in this embodiment, the two guide pins 32 each having a circular outer circumference and the two guide pin holes 51 corresponding to the two guide pins 32 are disposed so as to perform the alignment between the workpiece holding device 20 and the crossbar 10 in the direction substantially orthogonal to the inserting direction of the guide pin 32. However, the present invention is not limited thereto, and a configuration in which two or more guide pins and two or more guide pin holes are provided can be adopted.

Moreover, there can be adopted a configuration in which, for example, only a single guide pin is disposed, and the outer circumference of the guide pin is formed into a shape of a polygon, such as a triangle or a rectangle, or a shape having a planar surface in a part of the outer circumference (for example, a shape formed by cutting out a part of a circle so as to create a planar surface, such as a semicircle). Further, the guide pin is engaged with a guide pin hole corresponding to the guide pin so that, with use of the planar surface formed on a part of the outer circumference, the alignment between the workpiece holding device 20 and the crossbar 10 is performed in the direction substantially orthogonal to the inserting direction of the guide pin 32.

In this embodiment, when the workpiece holding device 20 is transferred from the crossbar 10 (attachment holder 43) to the workpiece holding device replacement and support truck 90 (receiving member 92) for supporting an unused workpiece holding device 20, the wedge portion 54B of the latch 54 is automatically moved by the latching mechanism so as to be retracted from the engagement portion, in association with the receiving motion of the workpiece holding device 20 (attachment 23) held on the crossbar 10 (attachment holder 43). Thus, the locking between the workpiece holding device 20 (attachment 23) and the crossbar 10 (attachment holder 43) is released. Accordingly, while a simple configuration is realized, the workpiece holding device 20 (attachment 23) can be released from the crossbar 10 (attachment holder 43) easily and reliably.

On the other hand, the workpiece holding device 20 (attachment 23) is received in the grooves 93 of the workpiece holding device replacement and support truck 90 (receiving member 92) and also is locked by the plungers 94, in association with the receiving motion of the workpiece holding device 20 (attachment 23) held on the crossbar 10 (attachment holder 43). Accordingly, after the release of the workpiece holding device 20 (attachment 23) from the crossbar 10 (attachment holder 43), even when the crossbar 10 (attachment holder 43) is retracted, the workpiece holding device 20 (attachment 23) can be held on the workpiece holding device replacement and support truck 90 (receiving member 92) without, for example, dropping the workpiece holding device 20 (attachment 23).

In this embodiment, when the crossbar 10 (attachment holder 43) receives the workpiece holding device 20 from the workpiece holding device replacement and support truck 90 (receiving member 92) on which the workpiece holding device 20 to be used is supported, the crossbar 10 (attachment holder 43) can automatically move the wedge portion 54B of the latch 54 by the latching mechanism so as to be engaged with the engagement portion of the workpiece holding device 20 (attachment 23). Accordingly, while ensuring a simple configuration, the crossbar 10 (attachment holder 43) can hold the workpiece holding device 20 (attachment 23) easily and certainly.

Moreover, when the workpiece holding device 20 (attachment 23) held on the crossbar 10 (attachment holder 43) is pulled out from the grooves 93 of the workpiece holding device replacement and support truck 90 (receiving member 92), the engagement by the plunger 94 is automatically released by the pulling motion. Accordingly, while ensuring a simple configuration, the crossbar 10 (attachment holder 43) can pull out the workpiece holding device 20 (attachment 23) from the workpiece holding device replacement and support truck 90 (receiving member 92) easily and certainly.

Therefore, according to this embodiment, while ensuring a light weight and compact configuration in a simple manner and at low cost, the workpiece holding device 20 can be automatically transferred to the workpiece holding device replacement and support truck 90 (receiving member 92) easily and smoothly, and hence preparatory work including, for example, replacement operation of the workpiece holding device 20 can be easily and quickly performed with high efficiency and accuracy, and thus the preparatory work time can be shortened so as to improve productivity and the like.

As described above, according to this embodiment, it is possible to provide the removably supporting mechanism for a workpiece holding device, which is capable of removably supporting, on the crossbar or the like, the workpiece holding device for holding a workpiece easily and smoothly while realizing a light weight and compact configuration in a simple manner and at low cost.

Moreover, it is possible to enable easy replacement of the workpiece holding device with respect to the crossbar or the like by using the removably supporting mechanism for a workpiece holding device according to this embodiment so that preparatory work can be performed easily and quickly with high efficiency and accuracy, and thus productivity is improved by shortening the time of preparatory work.

Note that, according to the removably supporting mechanism for a workpiece holding device of this embodiment, with the latching mechanism having a simple and light weight configuration, and the guide pins 32 and the guide pin holes 51, the workpiece holding device 20 (attachment 23) is aligned at a predetermined position with respect to the crossbar 10 (attachment holder 43) and is removably supported thereon. Accordingly, the weight of the crossbar unit (the crossbar 10 and the workpiece holding device 20), which is a movable part when conveying the workpiece, can be decreased, thereby decreasing the inertial force. With this, comparing to the conventional art, the workpiece conveying speed (the reciprocating speed of the crossbar) can be increased, thereby improving the productivity.

Moreover, the guide pin 32 and the guide pin hole 51 are configured to function as an air pressure supply passage, and hence no air supply tube or the like is required to be separately provided on the crossbar 10. With this, the following contribution can be made. That is, the weight of the crossbar unit (the crossbar 10 and the workpiece holding device 20), which is the movable part when conveying the workpiece, can be further decreased, and thus the workpiece conveying speed (the reciprocating speed of the crossbar) can be further increased.

The embodiment described above is merely an example for illustrating the present invention.

Besides the above, various changes and modifications can be made without departing from the spirit and scope of the present invention.

What is claimed is:

1. A removably supporting mechanism for a workpiece holding device for holding and releasing a workpiece, the workpiece holding device being removably supported on a crossbar extending substantially orthogonal to a workpiece conveying direction of a press machine, the removably supporting mechanism comprising:
   one of at least one guide pin and at least one guide pin hole disposed on the workpiece holding device side, the at least one guide pin being fittable into and engageable with the at least one guide pin hole; and
   another of the at least one guide pin and the at least one guide pin hole disposed on the crossbar side corresponding to the one of the at least one guide pin and the at least one guide pin hole, wherein:
   the at least one guide pin is fitted into and engaged with the at least one guide pin hole to perform alignment between the workpiece holding device and the crossbar in a direction substantially orthogonal to an inserting direction of the at least one guide pin,
   the workpiece holding device abuts against the crossbar in the inserting direction of the at least one guide pin to perform alignment between the workpiece holding device and the crossbar in the inserting direction of the at least one guide pin,
   the removably supporting mechanism further comprises a latching mechanism for locking the workpiece holding device and the crossbar with each other at an alignment position in the inserting direction of the at least one guide pin through a relative movement between the workpiece holding device and the crossbar when the at least one guide pin is fitted into and engaged with the at least one guide pin hole,
   the removably supporting mechanism is configured to removably support the workpiece holding device on the crossbar by locking the workpiece holding device with the crossbar at the alignment position in the inserting direction of the at least one guide pin by the latching mechanism when supporting the workpiece holding device on the crossbar, and by releasing a locking between the workpiece holding device and the crossbar by the latching mechanism when enabling the workpiece holding device to be released from the crossbar, and
   the latching mechanism comprises an engagement portion which is disposed on one of the workpiece holding device and the crossbar, the engagement portion abutting against another of the workpiece holding device and the crossbar in accordance with an approach between the workpiece holding device and the crossbar through their relative movement so as to be retracted against an elastic biasing force, the engagement portion being moved to an engagement position by the elastic biasing force when the workpiece holding device and the crossbar approach each other up to the alignment position in the inserting direction of the at least one guide pin so that the workpiece holding device and the crossbar are locked with each other.

2. A removably supporting mechanism for a workpiece holding device according to claim 1, wherein the locking between the workpiece holding device and the crossbar by the latching mechanism is released by retracing the engagement portion, which locks the workpiece holding device with the crossbar at the alignment position in the inserting direction of the at least one guide pin, from the engagement position against the elastic biasing force.

3. A workpiece holding device replacement and support apparatus for receiving, from a crossbar, and supporting a workpiece holding device, which is removably supported on the crossbar by the removably supporting mechanism for a workpiece holding device according to any one of claims 1 to 2, the workpiece holding device replacement and support apparatus comprising:
   a groove which receives a part of the workpiece holding device; and
   an engagement pin which is elastically biased toward the part of the workpiece holding device and protrudes from an inside of the groove,
   wherein the workpiece holding device replacement and support apparatus is configured to support the workpiece holding device and bring the crossbar into a state movable to a different position in the following manners:
   the groove receives the part of the workpiece holding device, which is conveyed in a state of being supported on the crossbar, and the engagement pin holds the workpiece holding device at a predetermined position in the groove; and
   the engagement portion of the latching mechanism is retracted from the engagement position against the elastic biasing force by causing a releasing pin to act on the engagement portion in association with a receiving motion into the groove so that the locking between the workpiece holding device and the crossbar by the latching mechanism is released so as to release the workpiece holding device from the crossbar.

4. A workpiece holding device replacement and support apparatus according to claim 3,
   wherein, when the crossbar approaches the workpiece holding device replacement and support apparatus for receiving the workpiece holding device supported by the workpiece holding device replacement and support apparatus, under a state in which the workpiece holding device and the crossbar are aligned with each other by the at least one guide pin and the at least one guide pin hole in accordance with an approaching motion of the crossbar, the crossbar supports the workpiece holding device by locking the crossbar and the workpiece holding device with each other by the engagement portion of the latching mechanism, and
   wherein, when the crossbar supporting the workpiece holding device moves to the different position, in accordance with its movement, the engagement pin is retracted against the elastic biasing force so as to release a holding of the workpiece holding device in the groove.

* * * * *